United States Patent
Keating

(10) Patent No.: US 10,100,760 B2
(45) Date of Patent: Oct. 16, 2018

(54) METHOD FOR OPERATING AN INTERNAL COMBUSTION ENGINE EMPLOYING A DEDICATED-CYLINDER EGR SYSTEM

(71) Applicant: GM GLOBAL TECHNOLOGY OPERATIONS LLC, Detroit, MI (US)

(72) Inventor: Edward J. Keating, Ortonville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 163 days.

(21) Appl. No.: 14/560,568

(22) Filed: Dec. 4, 2014

(65) Prior Publication Data

US 2016/0160772 A1    Jun. 9, 2016

(51) Int. Cl.

| | |
|---|---|
| *F02M 25/07* | (2006.01) |
| *F02D 41/00* | (2006.01) |
| *F01L 1/344* | (2006.01) |
| *F02D 15/00* | (2006.01) |
| *F02M 26/49* | (2016.01) |
| *F02D 13/02* | (2006.01) |

(Continued)

(52) U.S. Cl.
CPC .......... *F02D 41/0077* (2013.01); *F01L 1/344* (2013.01); *F02D 13/0203* (2013.01); *F02D 15/00* (2013.01); *F02D 41/0002* (2013.01); *F02D 41/0007* (2013.01); *F02M 26/22* (2016.02); *F02M 26/43* (2016.02); *F02M 26/49* (2016.02); *F02D 41/0065* (2013.01); *F02D 41/26* (2013.01); *F02D 2041/001* (2013.01); *Y02T 10/144* (2013.01); *Y02T 10/18* (2013.01)

(58) Field of Classification Search
CPC ............. F02D 41/0077; F02D 41/0007; F02D 41/0002; F02D 13/0203; F02D 15/00; F02D 41/007; F02D 41/0065; F02M 26/22; F02M 26/43; F02M 26/49; F01L 1/344; Y02T 10/18; F02B 75/04
USPC .................... 701/108; 123/568.21, 48 R, 78; 73/114.74
See application file for complete search history.

(56) References Cited

U.S. PATENT DOCUMENTS

| | | | |
|---|---|---|---|
| 8,291,891 B2 | 10/2012 | Alger, II et al. | |
| 2003/0131805 A1* | 7/2003 | Yang | F01L 1/34 123/27 R |

(Continued)

FOREIGN PATENT DOCUMENTS

| | | |
|---|---|---|
| WO | 2006052993 A2 | 5/2006 |
| WO | 2011117970 A1 | 9/2011 |
| WO | 2014005127 A2 | 1/2014 |

*Primary Examiner* — Hai Huynh
*Assistant Examiner* — Gonzalo Laguarda
(74) *Attorney, Agent, or Firm* — Quinn IP Law

(57) ABSTRACT

A multi-cylinder spark-ignition internal combustion engine (engine) that includes a dedicated-cylinder exhaust gas recirculation (EGR) system is described. The dedicated-cylinder EGR system includes a controllable exhaust gas diverter valve that selectively diverts all exhaust gas produced by one of the cylinders to an air intake system of the engine. A method for controlling the engine includes monitoring a parameter associated with operation of the dedicated-cylinder EGR system. Upon detecting a change in the parameter that indicates a change in operation of the dedicated-cylinder EGR system, a controller controls operation of the internal combustion engine to reduce an effective cylinder compression ratio.

15 Claims, 2 Drawing Sheets

(51) Int. Cl.
*F02M 26/22* (2016.01)
*F02M 26/43* (2016.01)
*F02D 41/26* (2006.01)

(56) References Cited

U.S. PATENT DOCUMENTS

| | | | | |
|---|---|---|---|---|
| 2008/0230041 A1* | 9/2008 | Brusslar | ............ | F02B 23/08 123/575 |
| 2012/0204845 A1* | 8/2012 | Gingrich | ............ | F02M 26/43 123/568.17 |
| 2014/0360461 A1* | 12/2014 | Ulrey | ............ | F02M 26/43 123/299 |
| 2015/0159588 A1* | 6/2015 | Geckler | ............ | F02M 25/07 123/672 |
| 2015/0252742 A1* | 9/2015 | Stroh | ............ | F02D 41/0085 60/274 |

* cited by examiner

METHOD FOR OPERATING AN INTERNAL COMBUSTION ENGINE EMPLOYING A DEDICATED-CYLINDER EGR SYSTEM

TECHNICAL FIELD

The present disclosure relates generally to internal combustion engines, and a method for monitoring and controlling operation thereof.

BACKGROUND

Internal combustion engines (engines) produce mechanical power in the form of torque and rotational speed by combusting a mixture of air and fuel within one or more combustion chambers. During combustion, various exhaust gases are produced. A portion of the exhaust gas can be recirculated back into the engine cylinders (via an exhaust gas recirculation system). The recirculated exhaust gas can displace an amount of combustible mixture in the cylinder resulting in increased engine efficiency and lower combustion temperatures. The recirculated exhaust gas can reduce the combustion temperature in the cylinder and/or reduce formation of certain gaseous byproducts.

During start-up or initial warm-up of the engine, recirculation of the portion of the exhaust gas back to the engine cylinders may not be desired, and therefore, a three-way valve can divert this exhaust gas out through an aftertreatment device including via a turbocharger. When the engine is warmed up, the three-way valve can divert the portion of the exhaust gas back to the engine to recirculate this exhaust gas into the engine cylinders.

Internal combustion engines may be employed to generate considerable levels of power for prolonged periods of time. Many such engine assemblies employ an air compressor device, e.g., a turbocharger or a supercharger to compress the airflow before it enters the intake manifold of the engine in order to increase power and efficiency. By way of example, a turbocharger is a turbine device driven by exhaust pressure that includes a centrifugal gas compressor that forces air into the combustion chambers of the engine at pressures that are greater than ambient atmospheric pressure. The additional mass of oxygen-containing air that is forced into the engine improves the engine's volumetric efficiency, allowing it to burn more fuel in a given cycle, and thereby produce more power. Generally, the turbocharger is disposed upstream of the aftertreatment device.

SUMMARY

A multi-cylinder spark-ignition internal combustion engine (engine) that includes a dedicated-cylinder exhaust gas recirculation (EGR) system is described. The dedicated-cylinder EGR system includes a controllable exhaust gas diverter valve that selectively diverts all exhaust gas produced by one of the cylinders to an air intake system of the engine. A method for controlling the engine includes monitoring a parameter associated with operation of the dedicated-cylinder EGR system. Upon detecting a change in the parameter that indicates a change in operation of the dedicated-cylinder EGR system, a controller controls operation of the internal combustion engine to reduce an effective cylinder compression ratio.

The detailed description and the drawings or Figures are supportive and descriptive of the disclosure, but the scope of the disclosure is defined solely by the claims. While some of the best modes and other embodiments for carrying out the claims have been described in detail, various alternative designs and embodiments exist for practicing the disclosure defined in the appended claims.

DETAILED DESCRIPTION

Figure 1:
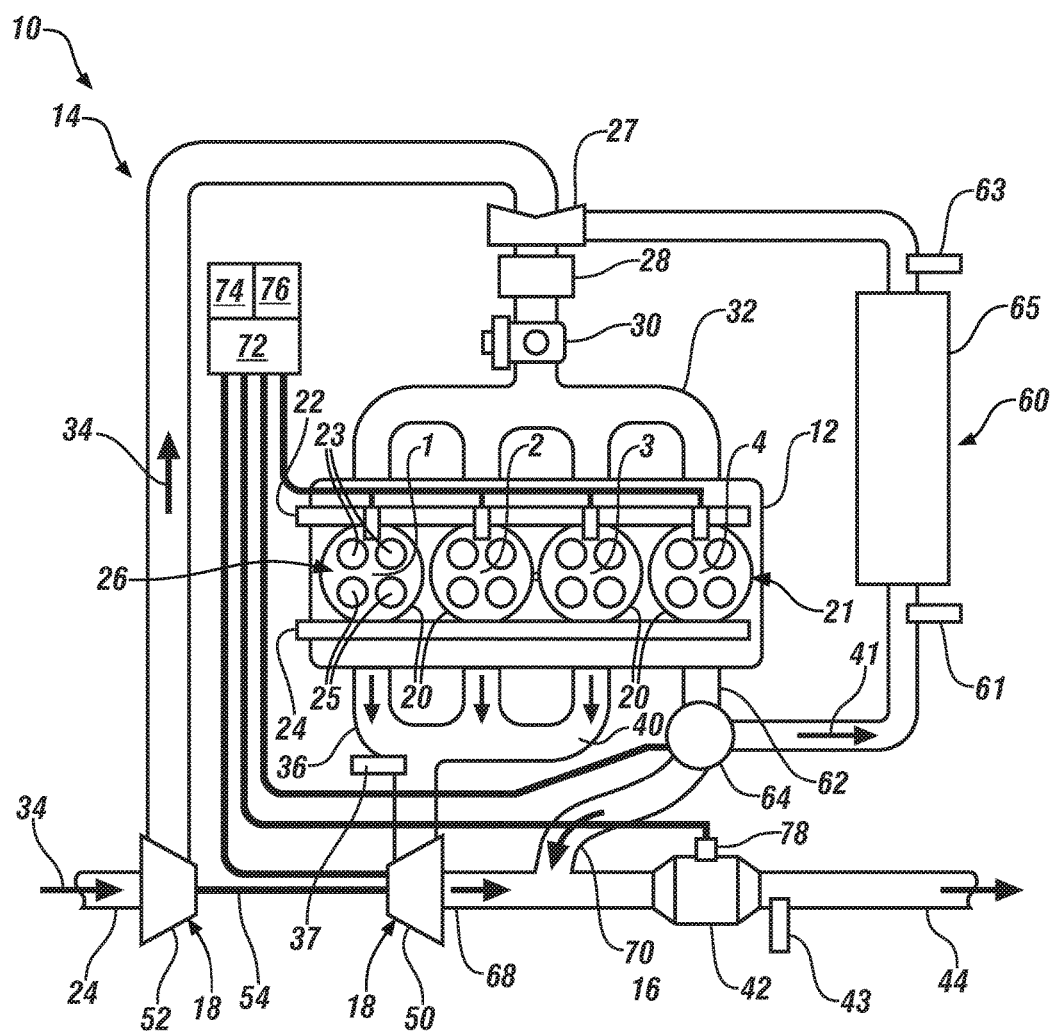
FIG. 1 is a schematic diagram of an engine subassembly, an air intake system, an exhaust system, a dedicated-cylinder exhaust gas recirculation (EGR) system and a turbocharger, in accordance with the disclosure.

Referring now to the drawings, wherein the depictions are for the purpose of illustrating certain exemplary embodiments only and not for the purpose of limiting the same, FIG. 1 schematically illustrates a four-cycle internal combustion engine (engine) 10 including an engine subassembly 12, an air intake system 14, an exhaust system 16, a dedicated-cylinder exhaust gas recirculation (EGR) system 60 and a turbocharger 18. The dedicated-cylinder EGR system 60 facilitates flow of exhaust gas between the exhaust system 16 and the air intake system 14 during engine operation. The air intake system 14 and the exhaust system 16 are in fluid communication with the engine 10 during operation.

The engine 10 preferably is a high-compression-ratio spark-ignited internal combustion engine or another suitable internal combustion engine configured to combust hydrocarbon fuels to generate torque. The engine subassembly 12 includes an engine block defining a plurality of cylinders 20 (referenced as cylinders 1-4, a corresponding plurality of pistons that slide within the cylinders 20, a rotatable crankshaft that couples to the pistons, a cylinder head 21, and other engine components such as piston connecting rods, pins, bearings and the like. Each of the cylinders 20 with corresponding piston and portion of the cylinder head 21 define a variable-volume combustion chamber 26. The engine 10 is preferably configured with a high geometric compression ratio, which is a 13:1 ratio in one embodiment. The cylinder head 21 includes one or more intake valves 23 and one or more exhaust valves 25 corresponding to each of the cylinders 20, and other components including fuel injectors and spark igniters. The intake valves 23 operatively connect to a variable intake valve activation system 22. The exhaust valves 25 operatively connect to a variable exhaust valve activation system 24 in some embodiments.

Each of the plurality of cylinders 20 selectively fluidly communicates with the air intake system 14 via the intake valves 23 to receive fresh/oxygenated air, and each of the plurality of cylinders 20 selectively fluidly communicates with the exhaust system 16 via the exhaust valves 25 to expel the byproducts of combustion. While the illustrated engine 10 depicts an inline 4-cylinder (14) engine, the present technology is equally applicable to other engine configurations, including, by way of non-limiting examples, I2, I3, I5 and I6 engines, or V-2, V-4, V-6, V-8, V-10, and V-12 engines, among others.

The air intake system 14 can generally include one or more of, a fresh-air inlet, an exhaust gas recirculation (EGR) mixer 27, a charge air cooler 28, a throttle 30 and an intake manifold 32. During operation of the engine 10, fresh air or intake air 34 can be ingested by the air intake system 14 from the atmosphere (or from an associated air-cleaner assembly) via the fresh-air inlet. The throttle 30 can include a controllable baffle configured to selectively regulate the total flow of air through the air intake system 14, and ultimately into the cylinders 20 (via the intake manifold 32). Airflow from the intake manifold 32 into each of the cylinders 20 is controlled by the intake valve(s) 23, the activation of which is controlled by the variable intake valve activation system 22. Exhaust flow out of each of the cylinders 20 to exhaust manifold 36 is controlled by the exhaust valve(s) 25, the activation of which may be controlled by the variable exhaust valve activation system 24 is some embodiments. The variable exhaust valve activation system 24 is not required.

In one embodiment, the variable intake valve activation system 22 includes a variable cam phasing/variable lift control (VCP/VLC) device 22 that controls the openings and closings of the intake valves 23 and the variable exhaust valve activation system 24 includes a variable cam phasing/variable lift control (VCP/VLC) device that controls the openings and closings of the exhaust valves 25. Alternatively, the variable exhaust valve activation system 24 is omitted and openings and closings of the exhaust valves 25 are controlled by an exhaust camshaft. Controlling the openings and closings of the intake valves 23 and the exhaust valves 25 can include controlling magnitude of valve lift and/or controlling phasing, duration or timing of valve openings and closings.

The intake VCP/VLC device 22 is disposed to control interactions between the intake valves 23 and an intake camshaft. The exhaust VCP/VLC device 24 is disposed to control interactions between the exhaust valves 25 and an exhaust camshaft in one embodiment. Alternatively, the exhaust valves 25 interact directly or via followers with an exhaust camshaft. The rotations of the intake and exhaust camshafts are linked to and indexed to rotation of the engine crankshaft, thus linking openings and closings of the intake and exhaust valves 23 and 25 to positions of the crankshaft and the pistons housed in the cylinders 20.

The intake VCP/VLC device 22 preferably includes a mechanism operative to switch and control valve lift of the intake valve(s) 23 in response to a control signal (iVLC) and/or variably adjust and control phasing and opening time of the intake camshaft for each cylinder 20 in response to a control signal (iVCP). The exhaust VCP/VLC device 24 preferably includes a controllable mechanism operative to variably switch and/or control valve lift of the exhaust valve(s) 25 in response to a control signal (eVLC) and variably adjust and control phasing and opening time of the exhaust camshaft for each cylinder 20 in response to a control signal (eVCP). The intake and exhaust VCP/VLC devices 22 and 24 may include a controllable two-step VLC mechanism operative to control magnitude of valve lift, or opening, of the intake and exhaust valve(s) 23 and 25, respectively, to one of two discrete steps. The two discrete steps preferably include a low-lift valve open position (about 4-6 mm in one embodiment) preferably for low speed, low load operation, and a high-lift valve open position (about 8-13 mm in one embodiment) preferably for high speed and high load operation. The intake and exhaust VCP/VLC devices 22 and 24 each preferably includes a variable cam phasing mechanism to control and adjust phasing (i.e., relative timing) of opening and closing of the intake valve(s) 23 and the exhaust valve(s) 25, respectively. Adjusting phasing refers to shifting opening times of the intake and exhaust valve(s) 23 and 25 relative to positions of the crankshaft and the piston in the respective cylinder 20. The VCP mechanisms of the intake and exhaust VCP/VLC devices 22 and 24 each preferably has a range of phasing authority of about 60°-90° of crank rotation, thus permitting the control module 5 to advance or retard opening and closing of one of intake and exhaust valve(s) 23 and 25 relative to position of the piston for each cylinder 20. The range of phasing authority is defined and limited by the intake and exhaust VCP/VLC devices 22 and 24. The intake and exhaust VCP/VLC devices 22 and 24 include camshaft position sensors to determine rotational positions of the intake and the exhaust camshafts. The VCP/VLC devices 22 and 24 are actuated using one of electro-hydraulic, hydraulic, and electric control force, in response to the respective control signals eVLC, eVCP, iVLC, and iVCP.

As appreciated, movement of each of the pistons in its corresponding cylinder is between a piston bottom-dead-center (BDC) location and a piston top-dead-center (TDC) location, which is linked to rotation of the crankshaft. Known four-cycle engines operate in a sequentially repeated pattern of intake, compression, power and exhaust strokes. During the compression stroke, a fuel/air charge in the combustion chamber 26 is compressed by rotation of the crankshaft and movement of the piston in preparation for ignition. The intake valve 23 and the exhaust valve 25 are closed during at least a portion of the compression stroke. Closing of the intake valve 23 can be controlled by controlling the variable intake valve activation system 22, resulting in controlling an effective compression ratio. The effective compression ratio is defined as a ratio of a volumetric displacement of the combustion chamber 26 at closing of the intake valve 23 and a minimum volumetric displacement of the combustion chamber 26, e.g., when the piston is at TDC. The effective compression ratio may differ from a geometric compression ratio, which is defined as a ratio of a maximum volumetric displacement of the combustion chamber 26 occurring at BDC and the minimum volumetric displacement of the combustion chamber 26 occurring at TDC without regard to closing time of the intake valve 23. A delayed closing of the intake valve 23 may trap less air in the combustion chamber 26, thus decreasing pressure and therefore decreasing temperature in the combustion chamber 26 during combustion. In one embodiment, fuel is metered and injected into the combustion chamber 26 during the intake stroke. Preferably, one fuel injection event is executed to inject fuel; however, multiple fuel injection events may be executed. In one embodiment, fuel is injected early enough in the intake stroke to allow adequate premixing of the fuel/air charge in the combustion chamber 26.

Figure 2:
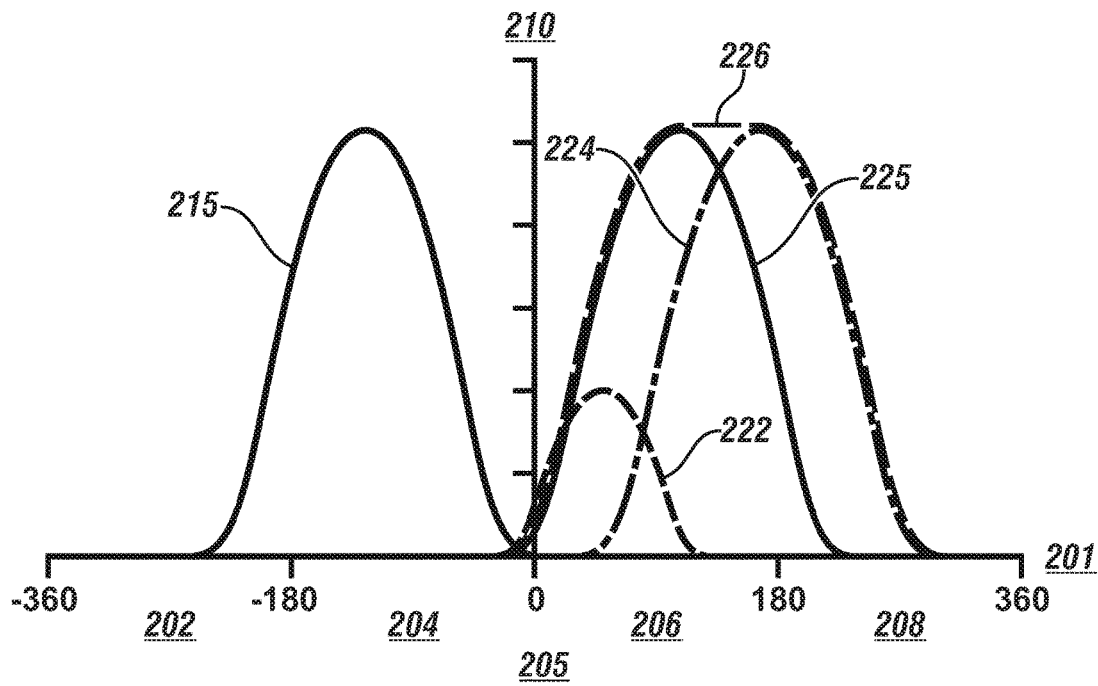
FIG. 2 graphically shows magnitude of valve lift (mm) in relation to piston position for a single cylinder over a single four-stroke 720° engine cycle for an exhaust valve and an intake valve of an embodiment of the internal combustion engine described with reference to FIG. 1, in accordance with the disclosure.

FIG. 2 graphically shows magnitude of valve lift (mm) on the vertical axis 210 in relation to crankshaft position on the horizontal axis 201 for a single cylinder over a single four-stroke 720° engine cycle that includes a power stroke 202, an exhaust stroke 204, an intake stroke 206 and a compression stroke 208. The piston position includes TDC 205 that demarks a transition from the exhaust stroke 204 to the intake stroke 206. The magnitudes of valve lift relate to an intake valve and an exhaust valve on an embodiment of an internal combustion engine, e.g., the engine 10 described with reference to FIG. 1.

A base exhaust valve travel 215 relative to crankshaft position 201 is shown prior to TDC 205, and a base intake valve travel 225 relative to crankshaft position 201 is shown after TDC 205. The base intake valve travel 225 includes valve travel that occurs when the intake VCP/VLC device 22 is at a default setting associated with warmed-up steady state engine operation at a mid-throttle load. A second intake valve travel 222 relates to operation of the engine to achieve an early intake valve closing (EIVC) state. The EIVC state 222 is achieved, in one embodiment, by reducing magnitude of valve lift of the intake valve to achieve a reduced intake valve open period, e.g., by controlling an embodiment of the controllable two-step VLC mechanism of the VLC/VCP device 22 to control magnitude of valve lift of the intake valve(s) 23 to a low-lift valve open position.

A third intake valve travel 224 relates to operation of the engine 10 to achieve a first late intake valve closing (LIVC) state. Operating the engine 10 in the first LIVC state 224 may include operating with no change in the valve lift and adjusting cam phasing of the intake valve opening time to delay opening of the intake valve 23 and correspondingly delaying the closing of the intake valve 23. A fourth intake valve travel 226 relates to operation of the engine 10 to achieve a second late intake valve closing (LIVC) state. Operating the engine 10 in the second LIVC state 226 may include operating with no change in the valve lift with an extended intake valve open period. The second LIVC state 226 is achieved, in one embodiment, by adjusting phasing and extending valve open period of the valve lift of the intake valve(s) 23, e.g., by controlling an embodiment of the controllable two-step VLC mechanism of the VLC/VCP device 22 to extend valve open period and delay phasing of the intake valve(s) 23. The EIVC state and the first and second LIVC states described herein serve to reduce an effective compression ratio of the engine with attendant reduction in pre-combustion temperatures. The EIVC state and the first and second LIVC states may also be effective in reducing pumping losses.

Referring again to FIG. 1, the charge air cooler 28 can be disposed between the EGR mixer 27 and the throttle 30. In general, the charge air cooler 28 can be a radiator-style heat exchanger that uses a flow of atmospheric air or liquid coolant to cool an intake air charge that is a mixture of fresh air and recirculated exhaust gas. As may be appreciated, the intake air charge can be warmer than atmospheric temperature due to the pressurization via the compressor 52, along with the mixing of the higher temperature cooled, recirculated exhaust gas contained in a second exhaust product 41. The charge air cooler 28 can cool the gas mixture to increase its density/volumetric efficiency, while also reducing the potential for abnormal combustion such as pre-ignition or knock.

The exhaust system 16 preferably includes an exhaust manifold 36 that entrains and directs exhaust gas away from the engine 10. Combustion of the fuel occurs within a first subset of the plurality of cylinders 20 to produce a first exhaust product 40. For example, the first subset of the plurality of cylinders 20 can be, as referenced in FIG. 1, cylinders 1-3, and the first exhaust product 40 can be exhaust gas, which is discussed further below. The exhaust system 16 is in fluid communication with the first subset of the plurality of cylinders 20. Therefore, the first exhaust product 40 can be expelled through the exhaust system 16. Specifically, the first exhaust product 40 can be guided through the exhaust manifold 36 away from the engine 10 and routed to the turbine 50 of the turbocharger 18. In certain embodiments, optionally, the exhaust flow from the cylinders 20 can be divided into different flows, which can be separately routed to the turbocharger 18 via multiple exhaust manifolds or headers. Combustion of the fuel also occurs within a second subset of the plurality of cylinders 20 to produce the second exhaust product 41. For example, the second subset of the plurality of cylinders 20 can be, as referenced in FIG. 1, the second exhaust product 41 expelled from cylinder 4.

The exhaust gas passes through an aftertreatment device 42 to catalyze, reduce and/or remove exhaust gas constituents prior to exiting the exhaust system 16 via a tailpipe 44. The aftertreatment device 42 can include one or combinations of catalytic devices, including, e.g., a three-way catalytic device, an oxidation catalyst, a hydrocarbon trap, a NOx adsorber, or any other suitable components and accompanying pipes and valves that function to oxidize, reduce, and otherwise catalyze and/or remove various exhaust gas constituents prior to exiting the exhaust system 16.

The air intake system 14 and the exhaust system 16 can be in mechanical communication through the turbocharger 18. The turbocharger 18 is in fluid communication with the exhaust system 16 and the turbocharger 18 expels the first exhaust product 40. The turbocharger 18 can include a turbine 50 in fluid communication with the exhaust system 16 and a compressor 52 in fluid communication with the air intake system 14. The turbine 50 and the compressor 52 can be mechanically coupled via a rotatable shaft 54. The turbocharger 18 can utilize the energy of the first exhaust product 40 flowing from the engine 10 to spin the turbine 50 and the compressor 52. The rotation of the compressor 52 draws fresh air 34 in from the fresh air inlet and compresses the air 34 into the remainder of the air intake system 14. The first exhaust product 40 is expelled through the turbocharger 18. Once the first exhaust product 40 is expelled from the turbocharger 18, the first exhaust product 40 flows toward the aftertreatment device 42.

The term "dedicated-cylinder EGR system" as employed herein refers to a system in which all exhaust gases generated in one or a plurality of the cylinders 20 are separated and routed to the air intake system 14. As shown, the dedicated-cylinder EGR system 60 selectively routes, e.g., via an EGR manifold 62 and a controllable diverter valve 64, the second exhaust product 41 from one or more of the cylinders 20 of the engine 10 back into the air intake system 14 as part of an intake air charge. Thus, the dedicated-cylinder EGR system 60 selectively fluid communicates with the second subset of the plurality of cylinders 20 and the air intake system 14 to route the second exhaust product 41 from the second subset of the plurality of cylinders 20 to the air intake system 14. This recirculated second exhaust product 41 can mix with the fresh air 34 within the EGR mixer 27 to dilute the oxygen content of the intake air charge. In one embodiment of the engine 10 employing the dedicated-cylinder EGR system 60, the magnitude of EGR dilution of the intake air charge is approximately a ratio of the number of dedicated EGR cylinders to the total number of cylinders. In FIG. 1, one cylinder, i.e., cylinder 4 supplies dedicated EGR for engine 12 that has a total of 4 cylinders so EGR dilution is approximately 25%. The use of the dedicated-cylinder EGR system 60 can increase fuel efficiency in spark ignition engines. Furthermore, the dedicated-cylinder EGR system 60 can reduce the combustion temperature and NOx production from the engine 10.

With continued reference to FIG. 1, one of the cylinders 20 (i.e., cylinder 4, as shown) is a dedicated-cylinder EGR cylinder that can selectively supply all of the second exhaust product 41 back to the air intake system 14. As mentioned above, the first exhaust product 40 of the remaining three cylinders 20 (i.e., cylinders 1-3) is expelled from the engine 10 via the exhaust system 16 through the aftertreatment device 42.

The diverter valve 64 selectively routes the second exhaust product 41 through the dedicated-cylinder EGR system 60, or alternatively into a second conduit 70.

During start-up or initial warm-up of the engine 10, it may be desirable to route the second exhaust product 41 away from the engine 10. Instead, the diverter valve 64 selectively bypasses the dedicated-cylinder EGR system 60 and routes the second exhaust product 41 through the second conduit 70 to the aftertreatment device 42. Alternatively, the diverter valve 64 may route the second exhaust product 41 through the second conduit 70 to be upstream of the turbine 50 of the turbocharger 18. Thus, in one embodiment the diverter valve 64 selectively routes the second exhaust product 41 away from the dedicated-cylinder EGR system 60 during warm-up of the engine 10. Once the desired temperature is reached, for example in the engine 10 or the aftertreatment device 42, the diverter valve 64 can then route the second exhaust product 41 through the dedicated-cylinder EGR system 60. Specifically, the diverter valve 64 can be coupled with the dedicated-cylinder EGR system 60 to selectively route the second exhaust product 41 downstream from the turbocharger 18 to bypass the dedicated-cylinder EGR system 60 or route the second exhaust product 41 through the dedicated-cylinder EGR system 60 back to the air intake system 14. It is to be appreciated that the diverter valve 64 can be any suitable type of valve capable of routing exhaust gas, and examples of suitable valves are a three-way valve, a flapper valve and a bypass valve. In one embodiment, the diverter valve 64 includes a valve position sensor (not shown).

The diverter valve 64 is disposed between the second subset of the plurality of cylinders 20, e.g., cylinder 4, and the dedicated-cylinder EGR system 60. The diverter valve 64 is coupled with the dedicated-cylinder EGR system 60 to selectively route the second exhaust product 41 downstream from the turbocharger 18 such that the first and second exhaust products 40, 41 mix downstream from the turbocharger 18, effecting an exothermic reaction to facilitate warm-up time of the aftertreatment device 42.

The diverter valve 64 is controlled to control the direction of flow of the second exhaust product 41. For example, the diverter valve 64 can be controlled to a first position to route the second exhaust product 41 toward the aftertreatment device 42 and bypass the dedicated-cylinder EGR system 60. The diverter valve 64 can also be controlled to a second position to route the second exhaust product 41 through the dedicated-cylinder EGR system 60 to the air intake system 14. Therefore, the second subset of the plurality of cylinders 20 (i.e., cylinder 4 in FIG. 1) is a dedicated-cylinder EGR cylinder producing the second exhaust product 41. When the diverter valve 64 is in the second position, all of the second exhaust product 41 is routed to the intake system 14, and when the diverter valve 64 is in the first position, all of the second exhaust product 41 is routed through the aftertreatment device 42.

A first conduit 68 is disposed between the turbocharger 18 and the aftertreatment device 42 to guide the first exhaust product 40 toward the aftertreatment device 42. The second conduit 70 is coupled with the diverter valve 64 and the first conduit 68 to guide the second exhaust product 41 into the first conduit 68 to mix the first and second exhaust products 40, 41 when the valve 68 is in the first position. Therefore, the diverter valve 64 is disposed between the second conduit 70 and the second subset of the plurality of cylinders 20. The diverter valve 64 is in fluid communication with the aftertreatment device 42 when in the first position and the diverter valve 64 is in fluid communication with the dedicated-cylinder EGR system 60 when in the second position.

Operation of the engine 10 can be monitored by a plurality of sensing devices. By way of non-limiting examples, the sensing devices can include a first exhaust gas sensor 37 that is disposed in the exhaust manifold 36, a second exhaust gas sensor 43 that is disposed in the exhaust gas feedstream downstream of the aftertreatment device 42, a temperature sensor 78 that is disposed to monitor temperature of the aftertreatment device 42, a first temperature sensor 61 that is disposed to monitor temperature of recirculated exhaust gas upstream of the EGR cooler 65 and a second temperature sensor 63 that is disposed to monitor temperature of recirculated exhaust gas downstream of the EGR cooler 65. The aforementioned sensors are provided for purposes of illustration. Any one of or all of the aforementioned sensors may be replaced by other sensing devices that monitor operation of the engine 10, or may instead be replaced by an executable model to derive a state of an operating parameter.

A controller 72 can be part of an electronic control module that is in communication with various components of the vehicle. The controller 72 includes a processor 74 and a memory 76 on which is recorded instructions for communicating with the diverter valve 64, the variable intake valve activation system 22, the turbocharger 18, the aftertreatment device 42, etc. The controller 72 is configured to execute the instructions from the memory 76, via the processor 74. For example, the controller 72 can be a host machine or distributed system, e.g., a computer such as a digital computer or microcomputer, acting as a vehicle control module, and/or as a proportional-integral-derivative (PID) controller device having a processor, and, as the memory 76, tangible, non-transitory computer-readable memory such as read-only memory (ROM) or flash memory. The controller 72 can also have random access memory (RAM), electrically erasable programmable read only memory (EEPROM), a high-speed clock, analog-to-digital (A/D) and/or digital-to-analog (D/A) circuitry, and any required input/output circuitry and associated devices, as well as any required signal conditioning and/or signal buffering circuitry. Therefore, the controller 72 can include all software, hardware, memory 76, algorithms, calibrations, connections, sensors, etc., necessary to monitor and control the diverter valve 64, the variable intake valve activation system 22, the turbocharger 18, the aftertreatment device 42, etc. As such, a control method can be embodied as software or firmware associated with the controller 72. It is to be appreciated that the controller 72 can also include any device capable of analyzing data from various sensors, comparing data, making the necessary decisions required to control and monitor the diverter valve 64, the variable intake valve activation system 22, the turbocharger 18, the aftertreatment device 42, etc.

Communications between controllers and between controllers, actuators and/or sensors may be accomplished using a direct wired link, a networked communications bus link, a wireless link or any another suitable communications link. Communications includes exchanging data signals in any suitable form, including, for example, electrical signals via a conductive medium, electromagnetic signals via air, optical signals via optical waveguides, and the like. The term 'model' refers to a processor-based or processor-executable code and associated calibration that simulates a physical existence of a device or a physical process.

The controller 72 includes the processor 74 and tangible, non-transitory memory 76 on which is recorded executable instructions. The controller 72 is configured to control the variable intake valve activation system 22 and the diverter valve 64 to route the second exhaust product 41. This includes the controller 72 configured to actuate the diverter valve 64 in the first position to route the second exhaust product 41 toward the aftertreatment device 42 and bypass the dedicated-cylinder EGR system 60, and also configured to actuate the diverter valve 64 in the second position to route the second exhaust product 41 through the dedicated-cylinder EGR system 60 back to the air intake system 14.

Figure 3:
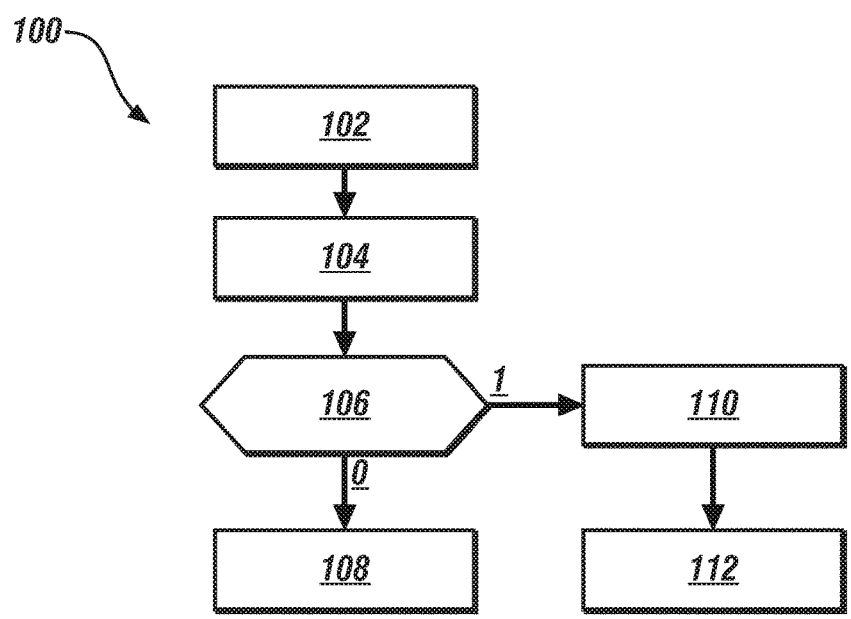
FIG. 3 schematically shows a dedicated-cylinder EGR system monitoring routine for monitoring operation of an embodiment of the dedicated-cylinder EGR system employed on an embodiment of the internal combustion engine described with reference to FIG. 1, in accordance with the disclosure.

FIG. 3 schematically shows a dedicated-cylinder EGR system monitoring routine 100 for monitoring operation of an embodiment of the dedicated-cylinder EGR system 60 which can be employed on an embodiment of the internal combustion engine 10 described with reference to FIG. 1. The dedicated-cylinder EGR system monitoring routine 100 is implemented as one or more algorithms and calibrations in the controller 72. Table 1 is provided as a key wherein the numerically labeled blocks and the corresponding functions are set forth as follows, corresponding to the dedicated-cylinder EGR system monitoring routine 100.

TABLE 1

| BLOCK | BLOCK CONTENTS |
| --- | --- |
| 102 | Monitor engine operating parameters |
| 104 | Monitor a parameter associated with operation of the dedicated-cylinder EGR system |
| 106 | Compare parameter(s) with an expected range of operation for the monitored parameter |
| 108 | End iteration |
| 110 | Mitigate risk of operating at high compression ratio by reducing effective cylinder compression ratio |
| 112 | End iteration |

The dedicated-cylinder EGR system monitoring routine 100 preferably executes periodically, e.g., once per second or at another suitable execution period to determine whether the dedicated-cylinder EGR system is operating as intended. A fault can include any change in operation of the dedicated-cylinder EGR system that causes a reduction in the EGR flow that is sufficient to reduce engine performance by an operator-discernible amount or decrease service life of one or more engine components or systems. As can be appreciated, fault thresholds are system-specific. A fault-related change in operation of the dedicated-cylinder EGR system can include a fault in the diverter valve, plugging of the EGR cooler, a fault in the coolant flow path through the EGR cooler, or another fault.

The dedicated-cylinder EGR system monitoring routine 100 includes monitoring engine operating parameters (102) and monitoring parameters associated with operation of the dedicated-cylinder EGR system (104). A parameter is defined as a measurable quantity that represents a physical property of a device or other element that is discernible using one or more sensors and/or a physical model. A parameter can have a discrete value, e.g., either "1" or "0", or can be infinitely variable in value.

The step of monitoring engine operating parameters (102) preferably includes monitoring one or more parameters that indicate that the engine is operating in a warmed-up condition and monitoring one or more parameters that indicate that no other system faults are present that may affect operation of the dedicated-cylinder EGR system or mask or otherwise influence the outcome of execution of the monitoring routine 100. By way of example, such engine operating parameters indicating that the engine is operating in a warmed-up condition can include a signal output from an engine coolant temperature sensor and a signal output from an exhaust gas sensor. By way of example, monitoring one or more parameters that indicate that no other system faults are present that may affect operation of the dedicated-cylinder EGR system or mask or otherwise influence the outcome of execution of the monitoring routine 100 can include monitoring occurrence of engine fault codes generated by an on-board diagnostics system executed in the controller.

The step of monitoring parameters associated with operation of the dedicated-cylinder EGR system (104) includes directly monitoring operation of components of the dedicated-cylinder EGR system, or monitoring operation of systems that are influenced by the operation of the dedicated-cylinder EGR system.

Directly monitoring operation of components of the dedicated-cylinder EGR system includes directly monitoring parameters associated with operation of the exhaust gas diverter valve, which can include monitoring signal output of a valve position sensor and comparing it with a commanded valve position to determine whether the signal output of the position sensor corresponds to the commanded valve position. Alternatively, directly monitoring operation of components of the dedicated-cylinder EGR system can include monitoring an exhaust gas temperature differential or an exhaust gas pressure differential across the EGR cooler 65.

Monitoring operation of systems that are influenced by the operation of the dedicated-cylinder EGR system 60 can include monitoring EGR flow to the air intake system 14 of the engine 10, monitoring cooling performance of the EGR cooler 65, monitoring engine pre-ignition or knock, or monitoring another performance parameter. Monitoring EGR flow to the engine 10 can be accomplished by directly monitoring EGR flow using a gas flow meter, monitoring EGR flow by monitoring an EGR temperature differential across the EGR cooler 65, or monitoring a coolant temperature differential through the EGR cooler 65.

Monitoring EGR flow to the engine can be accomplished by monitoring engine pre-ignition or knock based upon an analysis that indicates engine pre-ignition increases with a decrease in EGR flow. A decrease in EGR flow is associated with a fault in the dedicated-cylinder EGR system, e.g., a fault in the diverter valve or another component.

Monitoring EGR flow to the engine can be accomplished by monitoring a charge temperature of the intake air into the engine based upon an analysis that indicates that a decrease in the charge temperature of the intake air into the engine is associated with a decrease in EGR flow. Again, a decrease in EGR flow is associated with a fault in the dedicated-cylinder EGR system, e.g., a fault in the diverter valve or another component.

The monitored parameter(s) associated with operation of the dedicated-cylinder EGR system 60 is compared with an expected range of operation for the monitored parameter(s) (106) to determine whether the dedicated-cylinder EGR system 60 is operating in accordance therewith. A fault may be indicated when the monitored parameter(s) indicate that the dedicated-cylinder EGR system 60 or a specific component or other element thereof is outside of the expected range of operation.

When no fault is indicated by the monitored parameter(s) of the dedicated-cylinder EGR system (106)(0), this iteration of the monitoring routine 100 ends (108).

When a fault is indicated in the dedicated-cylinder EGR system (106)(1), operation of the internal combustion engine is controlled to reduce and otherwise mitigate effects of engine operation at a high compression ratio without high levels of EGR dilution in the intake air charge (110), and this iteration of the monitoring routine 100 ends (112). In one embodiment, mitigating the effects of engine operation at a high compression ratio without high levels of EGR dilution in the intake air charge includes controlling operation of the internal combustion engine to reduce the effective cylinder compression ratio.

Reducing the effective cylinder compression ratio includes implementing engine intake valve control strategies such as implementing the LIVC control strategy to reduce the effective compression ratio or implementing the EIVC control strategy to reduce the effective compression ratio as shown with reference to FIG. 2.

Employing the variable intake valve activation system 22 to implement the LIVC control strategy includes selecting control parameters for the variable intake valve activation system 22 that substantially reduce the effective compression ratio relative to the geometric compression ratio. This can include adjusting cam phasing to delay closing of the intake valve 23. By way of example, an engine employing the LIVC control strategy may need to have its compression ratio reduced from a geometric compression ratio that is at or near 13:1 to an effective compression ratio that is at or near 9:1 to mitigate effects of reduced EGR flow in the high-compression engine 10.

Employing the variable intake valve activation system 22 to implement the EIVC control strategy includes selecting control parameters for the variable intake valve activation system 22 that substantially reduce the effective compression ratio relative to the geometric compression ratio. This can include reducing the magnitude of the valve lift. Again, an engine employing the EIVC control strategy may need to have its effective compression ratio reduced from a geometric compression ratio that is at or near 13:1 to an effective compression ratio that is at or near 9:1 to mitigate effects of reduced EGR flow in the high-compression engine 10.

In the event of a fault in the dedicated EGR system, the high compression ratio may result in significantly reduced performance and/or engine damage, and can be minimized by the use of a 2-step intake valve system specifying an increased (LIVC) or decreased (EIVC) duration intake valve event as default when Dedicated EGR functionality is impeded or not possible. Thus the two-step intake valve system to implement a LIVC or EIVC intake valve event strategy allowing safe engine operation and minimal performance loss in the event of a fault in the dedicated EGR system.

While the best modes for carrying out the disclosure have been described in detail, those familiar with the art to which this disclosure relates will recognize various alternative designs and embodiments for practicing the disclosure within the scope of the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A method for operating a multi-cylinder spark-ignition internal combustion engine that includes a dedicated-cylinder exhaust gas recirculation (EGR) system, the dedicated-cylinder EGR system including a controllable exhaust gas diverter valve that selectively diverts all exhaust gas produced by one of the cylinders to an air intake system of the engine via a charge cooler, wherein a geometric compression ratio is defined based upon movement of pistons within corresponding cylinders between a bottom-dead-center location and a top-dead-center location, the method comprising:
   monitoring a parameter associated with the charge cooler during operation of the dedicated-cylinder EGR system; and
   upon detecting a change in the parameter associated with the charge cooler indicating a change in operation of the dedicated-cylinder EGR system, controlling, by a controller, operation of the internal combustion engine to reduce an effective cylinder compression ratio of all of the cylinders, wherein the effective cylinder compression ratio is reduced relative to the geometric compression ratio.

2. The method of claim 1, wherein the internal combustion engine further includes a variable intake valve activation system; and wherein controlling operation of the internal combustion engine to reduce the effective cylinder compression ratio comprises controlling the variable intake valve activation system to implement a late intake valve closing control strategy, wherein the late intake valve closing control strategy includes controlling the variable intake valve activation system to adjust cam phasing to delay opening of the intake valve until after the top-dead-center location for the respective cylinder.

3. The method of claim 1, wherein monitoring a parameter associated with the charge cooler comprises monitoring a pressure drop across the charge cooler.

4. The method of claim 1, wherein monitoring a parameter associated with the charge cooler comprises monitoring a temperature drop across the charge cooler.

5. The method of claim 1, wherein the internal combustion engine further includes a variable intake valve activation system; and wherein controlling operation of the internal combustion engine to reduce the effective cylinder compression ratio comprises controlling the variable intake valve activation system to implement an early intake valve closing control strategy, wherein the early intake valve closing control strategy includes controlling the variable intake valve activation system to adjust magnitude of valve lift of the intake valve to effect closing of the intake valve prior to the bottom-dead-center location for the respective cylinder.

6. The method of claim 1, further comprising directly monitoring operation of a component of the dedicated-cylinder EGR system; and
   upon detecting a change in the operation of the component, controlling, by a controller, operation of the internal combustion engine to reduce an effective cylinder compression ratio of all of the cylinders, wherein the effective cylinder compression ratio is reduced relative to the geometric compression ratio.

7. The method of claim 6, wherein directly monitoring operation of a component of the dedicated-cylinder EGR system comprises monitoring operation of the controllable exhaust gas diverter valve.

8. A method for operating a high compression ratio multi-cylinder internal combustion engine that includes a variable intake valve activation system and a dedicated-cylinder exhaust gas recirculation (EGR) system, the dedicated-cylinder EGR system including a controllable exhaust gas diverter valve that selectively diverts all exhaust gas produced by at least one of the cylinders to an air intake system of the engine via a charge cooler, wherein a geometric compression ratio is defined based upon movement of pistons within corresponding cylinders between a bottom-dead-center location and a top-dead-center location, the method comprising:
- monitoring a parameter associated with the charge cooler during operation of the dedicated-cylinder EGR system; and
- controlling, by a controller, the variable intake valve activation system to reduce an effective cylinder compression ratio when a change in the parameter associated with operation of the dedicated-cylinder EGR system indicates a degradation in operation of the dedicated-cylinder EGR system of all of the cylinders, wherein all of the cylinders undergo an equal reduction in the effective cylinder compression ratio.

9. The method of claim 8, wherein controlling the variable intake valve activation system to reduce the effective cylinder compression ratio comprises implementing a late intake valve closing control strategy, wherein the late intake valve closing control strategy includes controlling the variable intake valve activation system to adjust cam phasing to delay opening of the intake valve until after the top-dead-center location for the respective cylinder.

10. The method of claim 9, wherein controlling the variable intake valve activation system to reduce the effective cylinder compression ratio comprises implementing an early intake valve closing control strategy, wherein the early intake valve closing control strategy includes controlling the variable intake valve activation system to adjust magnitude of valve lift of the intake valve to effect closing of the intake valve prior to the bottom-dead-center location for the respective cylinder.

11. The method of claim 8, wherein monitoring a parameter associated with the charge cooler comprises monitoring a pressure drop across the charge cooler.

12. The method of claim 8, wherein monitoring a parameter associated with the charge cooler comprises monitoring a temperature drop across the charge cooler.

13. A high-compression-ratio multi-cylinder spark-ignition internal combustion engine, wherein a geometric compression ratio is defined based upon movement of pistons within corresponding cylinders between a bottom-dead-center location and a top-dead-center location, comprising:
- a dedicated-cylinder exhaust gas recirculation (EGR) system, the dedicated-cylinder EGR system including a controllable exhaust gas diverter valve that selectively diverts all exhaust gas produced by at least one of the cylinders to an air intake system of the engine;
- a charge cooler disposed between the exhaust gas diverter valve and the air intake system;
- a variable intake valve activation system; and
- a controller including an executable routine, the executable routine including an instruction set executable to:
  - monitor a parameter associated with the charge cooler during operation of the dedicated-cylinder EGR system; and
  - control operation of the internal combustion engine to reduce an effective cylinder compression ratio upon detecting a change in the parameter associated with the charge cooler indicating a degradation in operation of the dedicated-cylinder EGR system, wherein all of the cylinders undergo an equal reduction in the effective cylinder compression ratio.

14. The engine of claim 13, wherein the instruction set executable to monitor a parameter associated with the charge cooler comprises the instruction set executable to monitor a pressure drop across the charge cooler.

15. The engine of claim 13, wherein the instruction set executable to monitor a parameter associated with the charge cooler comprises the instruction set executable to monitor a temperature drop across the charge cooler.

* * * * *